United States Patent
Schmidt et al.

(10) Patent No.: US 8,090,580 B2
(45) Date of Patent: Jan. 3, 2012

(54) SYSTEMS AND METHODS FOR MAINTENANCE KNOWLEDGE MANAGEMENT

(75) Inventors: Brian Schmidt, Snohomish, WA (US); George Thomas, San Ramon, CA (US)

(73) Assignee: Oracle International Corporation, Redwood Shores, CA (US)

( * ) Notice: Subject to any disclaimer, the term of this patent is extended or adjusted under 35 U.S.C. 154(b) by 965 days.

(21) Appl. No.: 11/867,535

(22) Filed: Oct. 4, 2007

(65) Prior Publication Data

US 2009/0094028 A1    Apr. 9, 2009

(51) Int. Cl.
*G10L 15/00* (2006.01)

(52) U.S. Cl. ............... 704/235; 704/231; 369/25.01; 715/203

(58) Field of Classification Search .......... 704/231, 704/235; 369/25.01; 715/203
See application file for complete search history.

(56) References Cited

U.S. PATENT DOCUMENTS

| | | | | |
|---|---|---|---|---|
| 5,664,227 A | * | 9/1997 | Mauldin et al. | 715/203 |
| 5,835,667 A | * | 11/1998 | Wactlar et al. | 386/96 |
| 5,850,630 A | * | 12/1998 | Wilson | 704/270 |
| 7,039,585 B2 | * | 5/2006 | Wilmot et al. | 704/235 |
| 2007/0005569 A1 | | 1/2007 | Hurst-Hiller et al. | |

* cited by examiner

*Primary Examiner* — Daniel D Abebe
(74) *Attorney, Agent, or Firm* — Kilpatrick Townsend & Stockton LLP

(57) ABSTRACT

Knowledge-based information can be captured and processed to create a library of such knowledge. A maintenance worker performing a task for an asset can record audio and/or video information during the performance, and can upload the recording to a maintenance system. The system processes the recording to produce a text file corresponding to any speech during the recording, and generates a search index allowing the text file to be searched by a user. If the task is performed in the context of a work order, for example, information from the work order can be associated with the text file so that a user can search by text search, keyword, task, or other such information. A user then can locate and access the text file and/or the corresponding recording for playback.

20 Claims, 4 Drawing Sheets

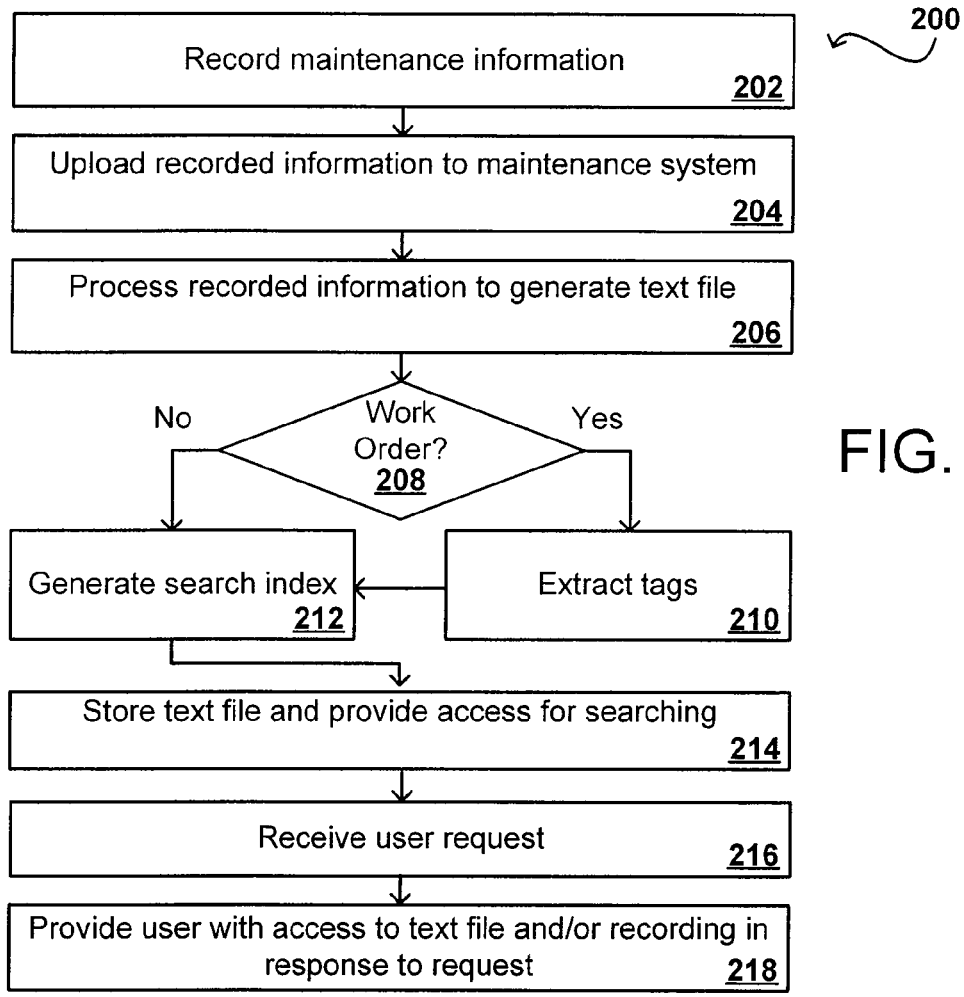

SYSTEMS AND METHODS FOR MAINTENANCE KNOWLEDGE MANAGEMENT

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to the management of knowledge-based information, and in particular to the storage and retrieval of knowledge-based information relating to asset maintenance tasks for an organization.

In the course of performing various asset maintenance tasks for an organization, technicians develop extensive knowledge and experience on the ideal methods and techniques for performing these tasks. Over time these technicians may be transferred to new assignments, retire, or leave the position or organization in some fashion. This highly-beneficial body of knowledge and experience thus goes with them, to the detriment of the organization.

Currently, some organizations request that technicians write up instructions for performing certain maintenance tasks. Such a process is very time consuming and thus costly for the organization, and technicians may not be skilled in writing instructional materials in a way that is useful for others. Further, technicians typically are busy and do not have the time to prepare such materials. Even further still, a technician may view this acquired knowledge as "job security" and may not be motivated to prepare such materials.

Even if the technicians write up the materials, the materials may be written in journals or logs that must be tracked, and that are only available in one location at a time. In some organizations the materials may be entered into a computer, but since many technicians may not be efficient typists, the time or desire to create such entries may be lacking. Further, there must be a way to organize these materials and be able to locate them on the network, which either requires training each technician how to store and/or provide access to the materials, or allocating another user able to receive and store the materials in a way that the materials can be accessed by a subsequent user. These approaches are not ideal for most organizations.

BRIEF SUMMARY OF THE INVENTION

Systems and methods in accordance with various embodiments of the present invention can overcome these and other deficiencies in existing knowledge-based information management systems by providing for the automatic processing, storing, and access of recording files for maintenance tasks.

In one embodiment, a user such as a technician can record audio and/or video information while performing a task such as the maintenance of an asset. The user then can upload the file to a maintenance system, whereby the recording file can be stored and processed. The user is able to talk while performing the maintenance, and if using video is able to demonstrate what is being done, thus saving time trying to later explain or write down what was done.

Once the recording file is received, the file is processed by a speech-to-text or similar application that generates a text file corresponding to the recording file. In one embodiment, the text file includes a computer-generated transcription of what the technician said during the recording. The text file then can be processed by a text indexer or such other module to generate a text index to be used in searching the document. In some embodiments, timestamps or other indicators are inserted into the text file so that a user can more easily locate a specific portion of the recording without having to playback the entire recording file.

If the task is related to a work order or similar object in the system, the recording file and/or text file can be associated with that object. In one embodiment, a user associates the recording file with the object, such that when the text file is generated tags can be extracted from properties of the object. In one example, information from a work order such as an asset type, problem, or solution, can be associated with the text file so that a user is able to search for information relating to those properties.

Once the recording and text files are processed, the files are available for access by a subsequent user. A user can submit a request such as a text search or keyword query, and can receive a list of results that match the query. The user can be presented with links to the text documents and/or the recording files. In some embodiments, the user will be presented with results for the text files, and the text files will include links to the corresponding recording files. If the text files include time stamps, a user may be able to directly access a specific point in the recording file. There also can be a list of work orders or other documents or work files that are associated with the text file and/or recording file.

A further understanding of the nature and the advantages of the inventions disclosed herein may be realized by reference of the remaining portions of the specification and the attached drawings.

BRIEF DESCRIPTION OF THE DRAWINGS

Various embodiments in accordance with the present invention will be described with reference to the drawings, in which:

FIG. 2 illustrates steps of a process that can be used in accordance with one embodiment;

FIG. 3 illustrates an exemplary screenshot that can be used in accordance with one embodiment;

DETAILED DESCRIPTION OF THE INVENTION

Systems and methods in accordance with various embodiments can overcome the aforementioned and other deficiencies in existing knowledge-based information management systems by providing for a substantially automated approach to generating searchable text documents and/or reference recording files. A user such as a technician is able to record audio and/or video information while performing a task such as maintaining an asset. The information then is processed using a speech-to-text application, for example, to generate an appropriate text file. If the work is associated to a particular work order, project, or other such task, the user can associate the recording with that task so that the information can be located by task properties. The text file also can be indexed and/or provided to a search program to allow a user to find the information by keyword or text searching. Such a process provides a simple way for a technician to store knowledge for a task, while providing a subsequent user with easy access to such information. While the various embodiments are described with respect to technicians performing maintenance tasks, it will be apparent from the specification that many other types of users can utilize the various embodiments to capture, store, access, and otherwise manage knowledge-based information that may be useful to another user.

Figure 1:
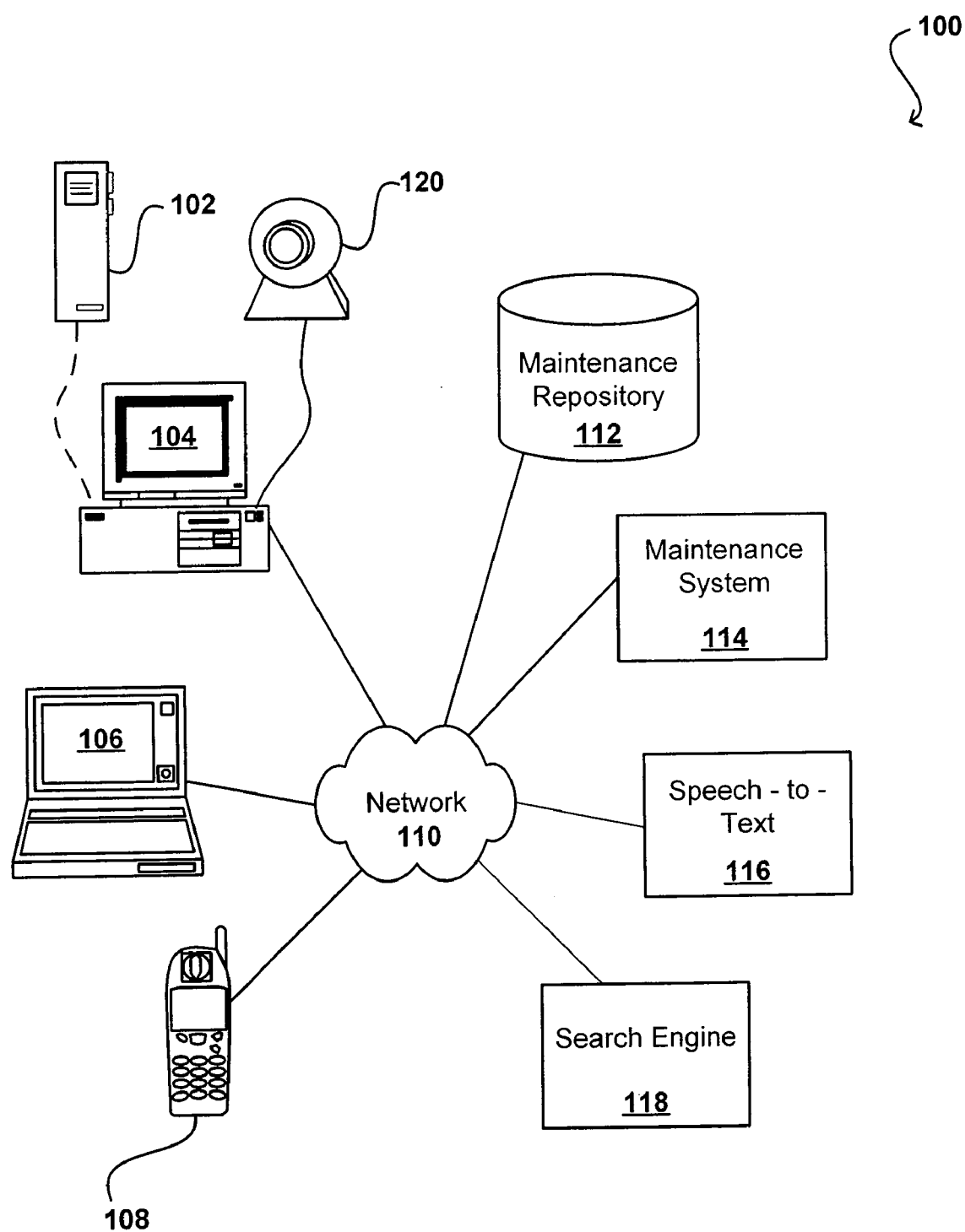
FIG. 1 illustrates a system for capturing and managing knowledge-based information that can be used in accordance with one embodiment.

FIG. 1 illustrates an exemplary system 100 that can be used to provide such functionality. Such a system can include a number of different devices allowing a technician to verbally and/or visually capture their knowledge and experiences via a recording such as a digital recording. For example, a technician may speak into a recording device 102, such as a portable audio and/or video recording device. The ability to use a portable device allows the technician to record information at any location where a task might be accomplished. Subsequently, the technician can upload the recording file from the recording device to the technician's computer 104 or any other appropriate location across the network 110. It should be understood that the connection can be a wired or wireless connection as known in the art. If the technician is performing a task at the technician's workstation, the technician can utilize a microphone of a desktop computer 104 while performing the task, whereby the computer is able to capture and store the information. If the user wishes to capture video information, the technician can use a screen capture program to also capture what is happening on the screen, and/or can use a Web cam or other camera 120 to also capture video information. Alternatively, the technician might use a laptop 106, cell phone 108, PDA, digital/video camera, or other portable device to capture the information, which then can directly transfer the recording file to the network, whether via a hardwire, cellular, wireless, or other connection. Many other ways for capturing audio and/or video information and uploading the information to a computer or network are well known in the art and will not be discussed herein in detail, but their use with the various embodiments would be apparent in light of the teachings and suggestions contained herein.

A technician typically will simply talk while performing the task, but may choose to also or alternatively provide at least a portion of the knowledge-based information before and/or after performing the task. A camera can also be setup to capture video of the technician performing the maintenance task. The recording of the audio/video information then can be uploaded to a computer or other device on the network 110 in order to be saved in a database system, such as a maintenance repository 112 used by a maintenance system 114 to store maintenance-related information.

The recorded information can be run through a process, such as a speech-to-text conversion process using an appropriate application or module 116. An example of such an application is Dragon NaturallySpeaking® available from Nuance Communications, Inc. of Burlington, Mass. In the exemplary configuration of FIG. 1, the speech-to-text application resides on the server side and is available across the network, such that the maintenance system can execute the process for a file received from a user across the network. It should be understood that the speech-to-text application could also reside on the client side, such as on the user's PC, such that the process is executed before the recorded file is uploaded to the network.

The speech-to-text application 116 is able to process the audio and/or video file and generate a text file in response thereto. The text file can be in any appropriate format useful for allowing users to access the information. The text file then can be stored to the appropriate repository, such as the maintenance repository 112.

In some embodiments, the user may also have the option of manually creating the text file instead of recording the information. In such a case, the user then can simply upload the text file to the network. A user also can have the ability in some systems to review the automatically generated text document in order to correct for conversion errors, etc.

Once the text file is generated, the maintenance system 114 can pass information for the text file to a full text indexer, such as may be part of a search engine 118 or search application. The text indexer can process the document to allow for subsequent keyword searching, pattern matching, etc., as known in the art.

If the task being performed by the technician is specific to a work order, for example, the technician can associate the recording to the work order during the setup, recording, storage, or other such process. If the recording is associated with such an object, the maintenance system 114 can utilize an auto keyword tag generator to generate keywords or tags based on attributes of that object, such as an asset type, sub-type, make, model, problem, cause, and/or resolution attribute for a work order object. These keywords then can allow a user to search based on a type of work order or asset, for example, instead of, or in addition to, a text-based search using words spoken by the technician during the recording. Further, a Work Order can be associated or unassociated to the text or recording at any time in the process. A user then can search for information by Work Order, or a list of associated Work Orders might appear as results of a user search, for example.

The process of converting the recording to text, full indexing of the text, and/or an auto-tagging of the text can be performed immediately at the time of the recording's creation, at substantially the time of upload of the recording, or as a batch process at regularly scheduled intervals, for example, depending on available computing resources and/or configuration choices of the maintenance system administrator and/or individual user. The combination of the recording, tags, and speech-to-text generated text will be referred to herein as a "Knowledge Entry". A Knowledge Entry can also include additional information, such as a system-generated or user-entered unique identifier and a formatted description. Knowledge Entries can be maintained as stand-alone entities not necessarily tied to one specific work order task. This allows a Knowledge Entry to be associated to any number of Work Order tasks, for example, or simply be provided as a resource library database of Knowledge Entries for technicians to reference in the completion of asset maintenance activities. If the Knowledge Entry is created in the context of completing a specific Work Order task then the Knowledge Entry can be automatically associated with that task, but will also still be available for association with other tasks. A search engine 118 or other such facility can be provided to allow a user at a computer 104, for example, to perform text and/or keyword tag searching of indexed Knowledge Entries with the results provided in the form of a list of relevant Knowledge Entries and/or their associated Work Order tasks. The Knowledge Entry's text and/or original audio/video recording can then be reviewed as so desired by the user.

The search engine can be configured by the administrator and/or user to return results in a number of different ways. In one embodiment, the search engine will return results for the various text documents, from which a user can access the corresponding audio and/or video recording. In another embodiment, the search engine can display links for both the text and recording files. In some embodiments, time stamps can be placed, periodically, regularly, or during times where the technician speaks, whereby the user can access a portion of the recording that is of interest. In one embodiment, links are placed at certain times in the text document that take the user directly to that point in the recording when selected by the user. In one embodiment, a time stamp is placed in the text document at regular intervals as specified by the user, such as at 1, 2, or 5 minute intervals. In other embodiments, a time stamp is placed in the document each time a user speaks during the recording after a period of silence. For example, if a technician is performing a task for 5 minutes without speaking, then speaks again to inform the person accessing the information of what the technician is doing at that point, the system can insert a time stamp at that point.

After processing, the recorded information and text documents for all such tasks can be stored in the maintenance repository 112 to create a library of resources for future users, in order to maintain an asset, go through a procedure, complete a job, etc. In this way the knowledge will not be lost to future users. If a user has a work order and wants to find related material, for example, the user can simply perform a text search (to search the body of the text) or a keyword search to search the tags.

FIG. 2 illustrates steps of an exemplary process for recording, processing, and retrieving knowledge-based information that can be used with the system of FIG. 1. In this process 200, a user such as a technician records information relating to maintenance of an asset 202. The technician, upon completing the recording, uploads the recording to a maintenance system 204, whereby the recording can be stored in a maintenance repository or other storage location for subsequent processing and/or retrieval. The recorded information is processed with a speech-to-text application, before or after uploading, in order to generate a text file corresponding to the recording 206. Between the recording and the uploading of the file, the user or other personnel might choose to edit the recorded file with any available off-the-shelf audio and/or video editing software, such as to remove portions of the recording deemed unnecessary, long pauses, redundant or redone portions, etc. If the recording is performed in the context of a work order or other such object 208, then tags can be extracted from (or entered for) the object to be used in associating the text with the object or task 210. A text indexer of a search engine can process the generated text document to create a search index for the document 212. The processed text file can be stored in the repository for subsequent access 214. A request then can be received from a user searching for, or requesting, knowledge-based information from the repository 216. The request can include keywords, tags, or text to be used in searching for the information. In response to the request, the system can provide a user with access to the most relevant file(s) 218, as well as links to related work orders. As discussed above, this can include access to the text file and/or the recording.

FIG. 3 illustrates an exemplary checklist screen 300 that can be used with such a process. As can be seen, this checklist is associated with a Work Order ID, a task number, and an asset ID. The screen also shows a list of steps to be performed for the task, as well as an indication of the type of task. The user is able to check off tasks as they are performed, and is able to upload the corresponding maintenance recording, which then can be automatically associated with the Work Order ID and/or Asset ID. The user is also able to fill in the technician's name as being responsible for completing that task, as well as the completion time and data. Such information can also be associated with the recording in some embodiments in order to further help in locating the recording file and/or associated text information. When selecting the "Upload Maintenance Recording" option in this example, the user can be presented with a pop-up window allowing the user to browse for or otherwise locate and select the recording for uploading to the maintenance repository or other appropriate location across the network.

Figure 4:
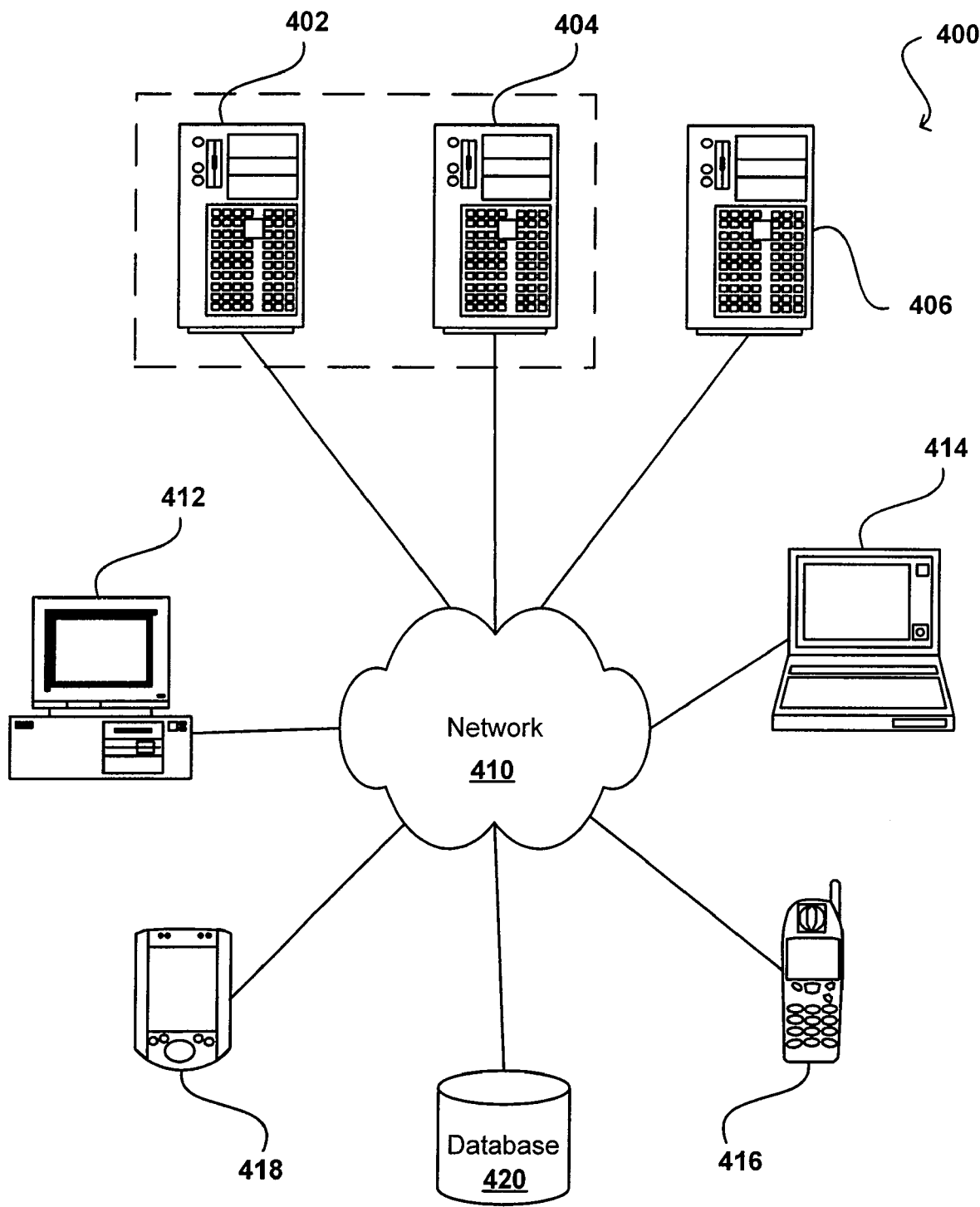
FIG. 4 illustrates components of a computer network that can be used in accordance with one embodiment of the present invention.

FIG. 4 is a block diagram illustrating components of an exemplary operating environment in which various embodiments of the present invention may be implemented. The system 400 can include one or more user computers, computing devices, or processing devices 412, 414, 416, 418, which can be used to operate a client, such as a dedicated application, web browser, etc. The user computers 412, 414, 416, 418 can be general purpose personal computers (including, merely by way of example, personal computers and/or laptop computers running a standard operating system), cell phones or PDAs (running mobile software and being Internet, e-mail, SMS, Blackberry, or other communication protocol enabled), and/or workstation computers running any of a variety of commercially-available UNIX or UNIX-like operating systems (including without limitation, the variety of GNU/Linux operating systems). These user computers 412, 414, 416, 418 may also have any of a variety of applications, including one or more development systems, database client and/or server applications, and Web browser applications. Alternatively, the user computers 412, 414, 416, 418 may be any other electronic device, such as a thin-client computer, Internet-enabled gaming system, and/or personal messaging device, capable of communicating via a network (e.g., the network 410 described below) and/or displaying and navigating Web pages or other types of electronic documents. Although the exemplary system 400 is shown with four user computers, any number of user computers may be supported.

In most embodiments, the system 400 includes some type of network 410. The network may can be any type of network familiar to those skilled in the art that can support data communications using any of a variety of commercially-available protocols, including without limitation TCP/IP, SNA, IPX, AppleTalk, and the like. Merely by way of example, the network 410 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, GRPS, GSM, UMTS, EDGE, 2G, 2.5G, 3G, 4G, Wimax, WiFi, CDMA 2000, WCDMA, the Bluetooth protocol known in the art, and/or any other wireless protocol); and/or any combination of these and/or other networks.

The system may also include one or more server computers 402, 404, 406 which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. One or more of the servers (e.g., 406) may be dedicated to running applications, such as a business application, a Web server, application server, etc. Such servers may be used to process requests from user computers 412, 414, 416, 418. The applications can also include any number of applications for controlling access to resources of the servers 402, 404, 406.

The Web server can be running an operating system including any of those discussed above, as well as any commercially-available server operating systems. The Web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 412, 414, 416, 418. As one example, a server may execute one or more Web applications. The Web application may be implemented as one or more scripts or programs written in any programming language, such as Java®, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 412, 414, 416, 418.

The system 400 may also include one or more databases 420. The database(s) 420 may reside in a variety of locations. By way of example, a database 420 may reside on a storage medium local to (and/or resident in) one or more of the computers 402, 404, 406, 412, 414, 416, 418. Alternatively, it may be remote from any or all of the computers 402, 404, 406, 412, 414, 416, 418, and/or in communication (e.g., via the network 410) with one or more of these. In a particular set of embodiments, the database 420 may reside in a storage-area network ("SAN") familiar to those skilled in the art. Similarly, any necessary files for performing the functions attributed to the computers 402, 404, 406, 412, 414, 416, 418 may be stored locally on the respective computer and/or remotely, as appropriate. In one set of embodiments, the database 420 may be a relational database, such as Oracle 10g, that is adapted to store, update, and retrieve data in response to SQL-formatted commands.

Figure 5:
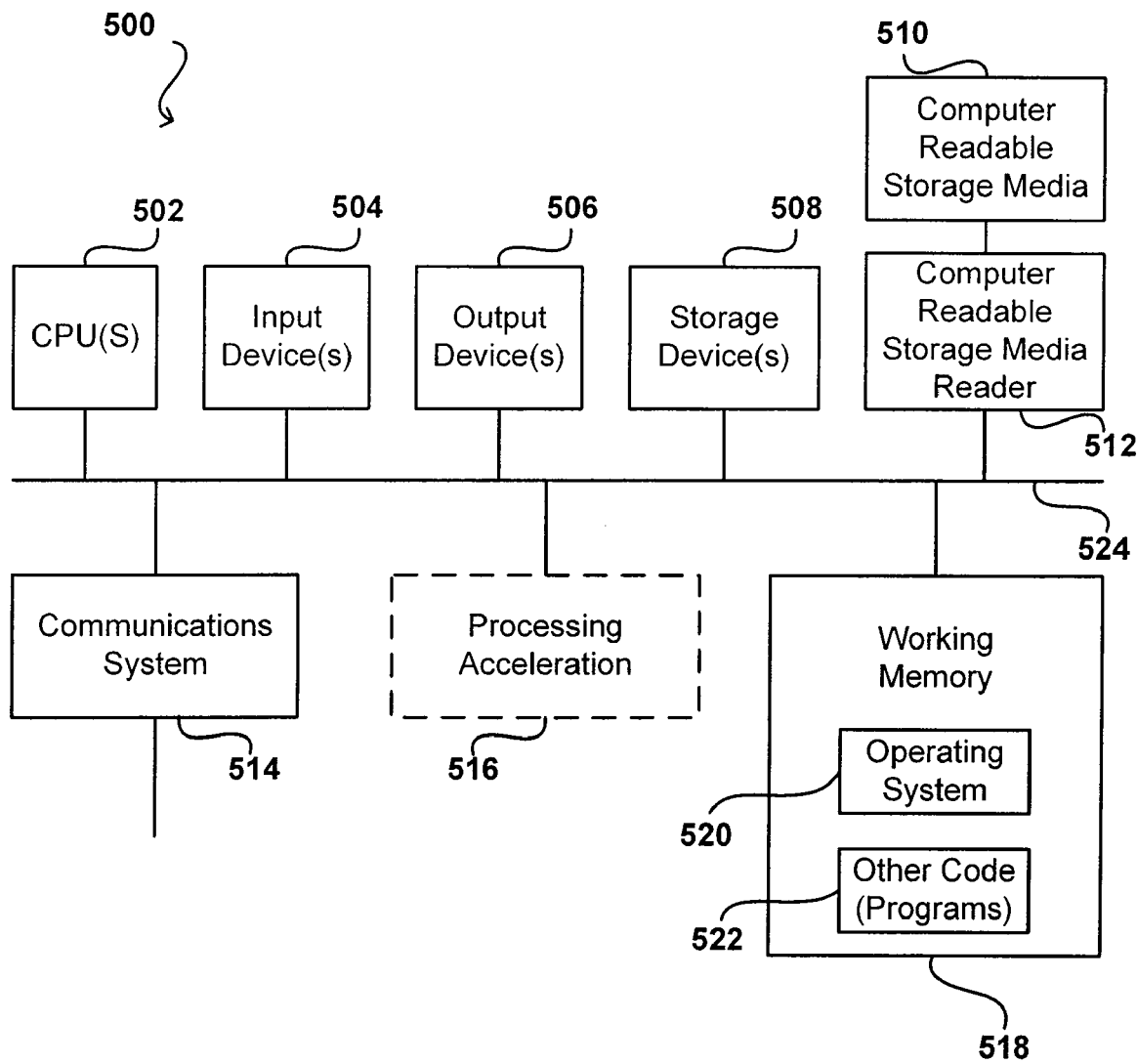
FIG. 5 illustrates components of a computerized device that can be used in accordance with one embodiment of the present invention.

FIG. 5 illustrates an exemplary computer system 500, in which various embodiments of the present invention may be implemented. The system 500 may be used to implement any of the computer systems described above. The computer system 500 is shown comprising hardware elements that may be electrically coupled via a bus 524. The hardware elements may include one or more central processing units (CPUs) 502, one or more input devices 504 (e.g., a mouse, a keyboard, etc.), and one or more output devices 506 (e.g., a display device, a printer, etc.). The computer system 500 may also include one or more storage devices 508. By way of example, the storage device(s) 508 can include devices such as disk drives, optical storage devices, solid-state storage device such as a random access memory ("RAM") and/or a read-only memory ("ROM"), which can be programmable, flash-updateable and/or the like.

The computer system 500 may additionally include a computer-readable storage media reader 512, a communications system 514 (e.g., a modem, a network card (wireless or wired), an infra-red communication device, etc.), and working memory 518, which may include RAM and ROM devices as described above. In some embodiments, the computer system 500 may also include a processing acceleration unit 516, which can include a digital signal processor DSP, a special-purpose processor, and/or the like.

The computer-readable storage media reader 512 can further be connected to a computer-readable storage medium 510, together (and, optionally, in combination with storage device(s) 508) comprehensively representing remote, local, fixed, and/or removable storage devices plus storage media for temporarily and/or more permanently containing, storing, transmitting, and retrieving computer-readable information. The communications system 514 may permit data to be exchanged with the network and/or any other computer described above with respect to the system 500.

The computer system 500 may also comprise software elements, shown as being currently located within a working memory 518, including an operating system 520 and/or other code 522, such as an application program (which may be a client application, Web browser, mid-tier application, RDBMS, etc.). It should be appreciated that alternate embodiments of a computer system 500 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method in a computer network of managing knowledge-based information, comprising:
   receiving a recording file from a user, the recording file including at least one of audio and video information relating to performance of a task;
   processing the recording file to generate a text file including a textual representation of information contained in the recording file;
   storing the recording file and the text file;
   generating one or more keyword tags based upon one or more properties of the task;
   generating one or more knowledge entries, wherein each of the knowledge entries references the recording file, the one or more keyword tags, and the textual representation;
   generating a search index that indexes the knowledge entries by keywords selected from the textual representation and by the one or more keyword tags; and
   allowing a subsequent user to search for at least one of the text file and the recording file using the search index.

2. A method according to claim 1, wherein:
   processing the recording file includes using a speech-to-text application to generate text for any speech included in the recording file.

3. A method according to claim 1, wherein:
   the task includes maintenance of an asset by a technician.

4. A method according to claim 1, wherein the task includes a work order, and further comprising:
   extracting properties from the work order and associating the properties with the text file, wherein the properties comprise an asset type, a make, a model, a problem, a cause, a resolution, or a combination thereof.

5. A method according to claim 1, further comprising:
   inserting a link into the text file allowing the user to access the recording file.

6. A method according to claim 1, further comprising:
   inserting time stamps in the text file corresponding to time points in the recording file.

7. A system of managing knowledge-based information, the system including a processor and memory storing instructions that, when executed by the processor, cause the system to:
   receive a recording file from a user, the recording file including a textual representation of at least one of audio and video information relating to performance of a task;
   process the recording file to generate a text file including information contained in the recording file;
   store the recording file and the text file;
   generate one or more keyword tags based upon one or more properties of the task;
   generate one or more knowledge entries, wherein each of the knowledge entries references the recording file, the one or more keyword tags, and the textual representation;
   generate a search index that indexes the knowledge entries by keywords selected from the textual representation and by the one or more keyword tags; and
   allow a subsequent user to search for at least one of the text file and the recording file using the search index.

8. A system according to claim 7, wherein the instructions for processing the recording file further cause the system to use a speech-to-text application to generate text for any speech included in the recording file.

9. A system according to claim 7, wherein:
   the task includes maintenance of an asset by a technician.

10. A system according to claim 7, wherein the task includes a work order, and the instructions further cause the system to:
    extract properties from the work order and associate the properties with the text file, wherein the properties comprise an asset type, a make, a model, a problem, a cause, a resolution, or a combination thereof.

11. A system according to claim 7, wherein the instructions further cause the system to:
    insert a link into the text file allowing the user to access the recording file.

12. A system according to claim 7, wherein the instructions further cause the system to:
    insert time stamps in the text file corresponding to time points in the recording file.

13. A computer program product embedded in a non-transitory computer readable medium for managing knowledge-based information, comprising:
    computer code for receiving a recording file from a user, the recording file including at least one of audio and video information relating to performance of a task;
    computer code for processing the recording file to generate a text file including a textual representation of information contained in the recording file;
    computer code for storing the recording file and the text file;
    computer code for generating one or more keyword tags based upon one or more properties of the task;
    computer code for generating one or more knowledge entries, wherein each of the knowledge entries references the recording file, the one or more keyword tags, and the textual representation;
    computer code for generating a search index that indexes the knowledge entries by keywords selected from the textual representation and by the one or more keyword tags; and
    computer code for allowing a subsequent user to search for at least one of the text file and the recording file.

14. The computer program product according to claim 13, wherein:
    computer code for processing the recording file includes computer code for using a speech-to-text application to generate text for any speech included in the recording file.

15. The computer program product according to claim 13, wherein:
    the task includes maintenance of an asset by a technician.

16. The computer program product according to claim 13, wherein the task includes a work order, and further comprising:
    computer code for extracting properties from the work order and associating the properties with the text file, wherein the properties comprise an asset type, a make, a model, a problem, a cause, a resolution, or a combination thereof.

17. The computer program product according to claim 13, further comprising:
    computer code for inserting a link into the text file allowing the user to access the recording file.

18. The computer program product according to claim 13, further comprising:
    computer code for inserting time stamps in the text file corresponding to time points in the recording file.

19. A method for providing knowledge-based information, comprising:
    storing a recording file including at least one of audio and video information recorded by a first user and relating to performance of a task;
    storing a text file generated by processing the recording file to extract a textual representation of information contained in the recording file;
    storing a search index for the recording file and the text file;
    generating one or more keyword tags based upon one or more properties of the task;
    generating one or more knowledge entries, wherein each of the knowledge entries references the recording file, the one or more keyword tags, and the textual representation;
    generating a search index that indexes the knowledge entries by keywords selected from the textual representation and by the one or more keyword tags; and
    allowing a subsequent user to search for at least one of the text file and the recording file using the search index.

20. A method of providing maintenance information for an asset type, comprising:
    receiving a request for maintenance information for an asset type from a user;

locating maintenance information related to an asset type; and displaying the maintenance information to a user, wherein the displayed maintenance information includes three types of information, the types of information including links to recording files recorded by a maintenance user during performance of maintenance for that asset type, links to text files generated by processing the recording files to extract a textual representation of information contained in the recording files, and links to work orders for that asset type, the recording files associated with a search index, the search index generated by:

generating one or more keyword tags based upon one or more properties of the work orders;

generating one or more knowledge entries, wherein each of the knowledge entries references the recording file, the one or more keyword tags, and the textual representation; and generating the search index, wherein the search index indexes the knowledge entries by keywords selected from the textual representation and by the one or more keyword tags.

* * * * *

UNITED STATES PATENT AND TRADEMARK OFFICE
CERTIFICATE OF CORRECTION

PATENT NO. : 8,090,580 B2
APPLICATION NO. : 11/867535
DATED : January 3, 2012
INVENTOR(S) : Schmidt et al.

It is certified that error appears in the above-identified patent and that said Letters Patent is hereby corrected as shown below:

In column 6, line 54, delete "GRPS," and insert -- GPRS, --, therefor.

Signed and Sealed this
Twenty-seventh Day of March, 2012

David J. Kappos
*Director of the United States Patent and Trademark Office*